(12) United States Patent
Didari et al.

(10) Patent No.: US 12,067,485 B2
(45) Date of Patent: Aug. 20, 2024

(54) LONG SHORT-TERM MEMORY ANOMALY DETECTION FOR MULTI-SENSOR EQUIPMENT MONITORING

(71) Applicant: Applied Materials, Inc., Santa Clara, CA (US)

(72) Inventors: Sima Didari, San Jose, CA (US); Tianqing Liao, Mountain View, CA (US); Harikrishnan Rajagopal, Santa Clara, CA (US)

(73) Assignee: Applied Materials, Inc, Santa Clara, CA (US)

( * ) Notice: Subject to any disclaimer, the term of this patent is extended or adjusted under 35 U.S.C. 154(b) by 1106 days.

(21) Appl. No.: 16/580,761

(22) Filed: Sep. 24, 2019

(65) Prior Publication Data

US 2020/0104639 A1    Apr. 2, 2020

Related U.S. Application Data

(60) Provisional application No. 62/738,060, filed on Sep. 28, 2018.

(51) Int. Cl.
*G06N 3/049*      (2023.01)
*G06F 18/214*     (2023.01)
*G06N 3/08*       (2023.01)

(52) U.S. Cl.
CPC ........... *G06N 3/08* (2013.01); *G06F 18/2148* (2023.01); *G06N 3/049* (2013.01)

(58) Field of Classification Search
CPC .............................. G06N 3/049; G06K 9/6257
See application file for complete search history.

(56) References Cited

U.S. PATENT DOCUMENTS

2016/0163035 A1    6/2016   Chang et al.

FOREIGN PATENT DOCUMENTS

CN    108255656 A    7/2018
JP    2018092511 A    6/2018
(Continued)

OTHER PUBLICATIONS

Kim, C., Lee, J., Kim, R., Park, Y., & Kang, J. (2018). DeepNAP: Deep neural anomaly pre-detection in a semiconductor fab. Information Sciences, 457, 1-11. (Year: 2018).*

(Continued)

*Primary Examiner* — Kamran Afshar
*Assistant Examiner* — Lokesha G Patel
(74) *Attorney, Agent, or Firm* — Lowenstein Sandler LLP

(57) ABSTRACT

Methods, systems, and non-transitory computer readable medium are provided for long short-term memory (LSTM) anomaly detection for multi-sensor equipment monitoring. A method includes training a LSTM recurrent neural network (RNN) model for semiconductor processing fault detection. The training includes generating training data for the LSTM RNN model and providing the training data to train the LSTM RNN model on first training input and first target output to generate a trained LSTM RNN model for the semiconductor processing fault detection. The training data includes the first training input and the first target output based on normal runs of manufacturing processes of semiconductor processing equipment. Another method includes providing input based on runs of manufacturing processes of semiconductor processing equipment to a trained LSTM RNN model; obtaining one or more outputs from the trained LSTM RNN model; and using the one or more outputs for semiconductor processing fault detection.

19 Claims, 8 Drawing Sheets

(56) References Cited

FOREIGN PATENT DOCUMENTS

| | | |
|---|---|---|
| KR | 20180061769 A | 6/2018 |
| KR | 20180097282 A | 8/2018 |

OTHER PUBLICATIONS

Malhotra, P., Ramakrishnan, A., Anand, G., Vig, L., Agarwal, P., & Shroff, G. (2016). LSTM-based encoder-decoder for multi-sensor anomaly detection. arXiv preprint arXiv:1607.00148. (Year: 2016).*

Wang, J., Zhang, J., & Wang, X. (2018). Bilateral LSTM: A two-dimensional long short-term memory model with multiply memory units for short-term cycle time forecasting in re-entrant manufacturing systems. IEEE Transactions on Industrial Informatics, 14(2), 748-758. (Year: 2018).*

Jaikumar, P., Gacic, A., Andrews, B., & Dambier, M. (May 2011). Detection of anomalous events from unlabeled sensor data in smart building environments. In 2011 IEEE International Conference on Acoustics, Speech and Signal Processing (ICASSP) (pp. 2268-2271). IEEE. (Year: 2011).*

Li, D., Chen, D., Goh, J., & Ng, S. K. (2018). Anomaly detection with generative adversarial networks for multivariate time series. arXiv preprint arXiv:1809.04758. (Year: 2018).*

Qiao, H., Wang, T., Wang, P., Qiao, S., & Zhang, L. (2018). A time-distributed spatiotemporal feature learning method for machine health monitoring with multi-sensor time series. Sensors, 18(9), 2932. (Year: 2018).*

International Search Report and Written Opinion mailed Jan. 14, 2020, on application No. PCT/US2019/0553304.

* cited by examiner

LONG SHORT-TERM MEMORY ANOMALY DETECTION FOR MULTI-SENSOR EQUIPMENT MONITORING

RELATED APPLICATION

This application claims the benefit of Provisional Application No. 62/738,060, filed Sep. 28, 2018, the entire contents of which are incorporated by reference in their entirety.

TECHNICAL FIELD

The present disclosure relates to anomaly detection, and, more particularly, anomaly detection for multi-sensor equipment monitoring.

BACKGROUND

Manufacturing processes (e.g., in the semiconductor and display industries) can be complex. Conducting root cause analysis of manufacturing processes at the time of failure or anomaly occurrence may be time consuming (e.g., may cause down time) and may depend on domain expertise.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method may include training, by a processing device, a long short-term memory (LSTM) recurrent neural network (RNN) model for semiconductor processing fault detection. The training of the LSTM RNN model may include generating, by the processing device, training data for the LSTM RNN model. The generating of the training data may include generating first training input and first target output based on normal runs of manufacturing processes of semiconductor processing equipment. The training of the LSTM RNN model may further include providing, by the processing device, the training data to train the LSTM RNN model on the first training input and the first target output to generate a trained LSTM RNN model for the semiconductor processing fault detection.

In a further aspect of the disclosure, a method may include providing, by a processing device, input to a trained long short-term memory (LSTM) recurrent neural network (RNN) model. The input may be based on runs of manufacturing processes of semiconductor processing equipment. The method may further include obtaining, by the processing device, one or more outputs from the trained LSTM RNN model. The one or more outputs may include reconstruction data. The method may further include using, by the processing device, the one or more outputs for semiconductor processing fault detection.

BRIEF DESCRIPTION OF THE DRAWINGS

The present disclosure is illustrated by way of example, and not by way of limitation in the figures of the accompanying drawings.

DETAILED DESCRIPTION

Figure 1:
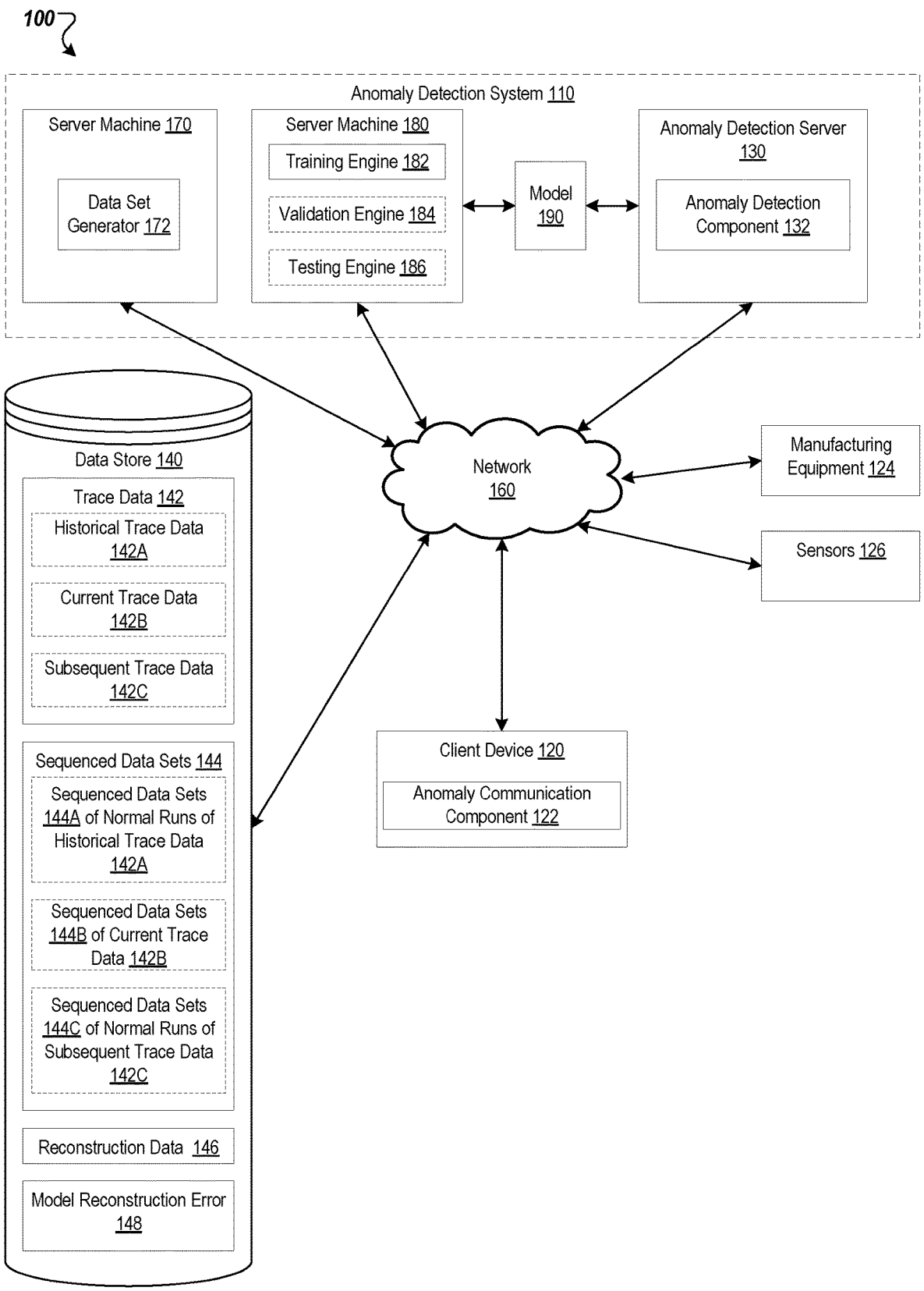
FIG. 1 is a block diagram illustrating an exemplary system architecture, according to certain embodiments.

Described herein are technologies directed to LSTM anomaly detection for multi-sensor equipment monitoring. Manufacturing equipment (e.g., semiconductor or display processing tools) perform manufacturing processes (e.g., semiconductor or display manufacturing processes, etc.). Sensors may be coupled to the manufacturing equipment and each sensor may measure values (e.g., pressure, temperature, flow, power, current, voltage, etc.) during manufacturing processes. There may be hundreds of sensors measuring values corresponding to manufacturing processes of manufacturing equipment and logs of sensor data may be produced. Statistical analysis may be run on the sensor data to determine if the manufacturing equipment is in a healthy state or to measure performance of the manufacturing equipment (e.g., univariate sensor analysis and trace data summary statistics). Anomalies and causes of anomalies may be difficult to determine by looking at statistical information of sensor data (e.g., from hundreds of sensors). By trial and error based on domain knowledge (e.g., in-depth tool and process specific knowledge), combinations of sensors (e.g., using feature engineering) can be identified for analysis for detecting anomalies and causes of anomalies. Identifying combinations of sensors may be laborious, manual, and hard to scale. Even once a combination of sensors is identified for analysis, there may be other combinations of sensors that are currently indicative or in the future would be indicative of other anomalies and other causes of anomalies.

The devices, systems, and methods disclose herein provide LSTM anomaly detection for multi-sensor equipment monitoring. A processing device may train an LSTM recurrent neural network (RNN) model for semiconductor equipment or display equipment fault detection. To train the LSTM RNN model, the processing device may generate training data for the LSTM RNN model. To generate the training data, the processing device may generate first training input and first target output based on normal runs of manufacturing processes of semiconductor processing equipment. The processing device may further provide the training data to train the LSTM RNN model on the first training input and the first target output to generate a trained LSTM RNN model for the semiconductor processing fault detection. To use the trained LSTM RNN model, a processing device may provide input based on runs of manufacturing processes of semiconductor processing equipment to the trained LSTM RNN model. The processing device may further obtain one or more outputs (e.g., including reconstruction data) from the trained LSTM RNN model and use the one or more outputs for semiconductor processing fault detection.

A processing device may use an LSTM model to analyze sensor data from multiple sensors (e.g., hundreds of sensors) to determine anomalies and causes of anomalies (e.g., without the laborious and time consuming trial and error performed by users using their domain knowledge). A processing device may use an LSTM model to analyze and determine different combinations of sensors over time (e.g., a first combination of sensors over a first period of time, a second combination of sensors over a second period of time) that correspond to anomalies and causes of anomalies.

Aspects of the present disclosure result in technological advantages of reducing downtime in a manufacturing facility responsive to finding the root cause of failure of a device (e.g., specific component of the manufacturing equipment, sensor, etc.). Aspects of the present disclosure also result in technological advantages of significant reduction in energy consumption (e.g., battery consumption), bandwidth, latency, and so forth. In some embodiments, the technological advantages may result from a processing device using an LSTM model to determine anomalies in the manufacturing processes and to determine causes of the anomalies in the manufacturing equipment performing the manufacturing processes. By using an LSTM model, the processing device reduces the processor overhead, energy consumption, and bandwidth used by conventional laborious trial and error. By use of an LSTM model, the processing device may identify one or more anomalies and causes of the anomalies. By use of LSTM anomaly detecting, the processing device may provide alerts to users and shut down manufacturing equipment responsive to detecting an anomaly. By use of LSTM anomaly detecting, the processing device may reduce downtime of manufacturing equipment and downtime of the manufacturing facility by identifying root causes of anomalies and providing alerts. LSTM anomaly detecting may provide a fast, scalable, automated, and accurate framework for root cause analysis and anomaly detection to reduce down time in a manufacturing facility and may be used by users that do not in-depth domain knowledge.

FIG. 1 is a block diagram illustrating an exemplary system architecture 100, according to certain embodiments. The system architecture 100 includes client device 120, an anomaly detection server 130, and a data store 140. The anomaly detection server 130 may be part of an anomaly detection system 110.

The client device 120, anomaly detection server 130, data store 140, server machine 170, server machine 180, manufacturing equipment 124 (e.g., semiconductor or display processing tools that perform semiconductor or display manufacturing processes, etc.), and sensors 126 may be coupled to each other via a network 160 for anomaly detecting for multi-sensor equipment monitoring. In some embodiments, network 160 is a public network that provides client device 120 with access to the anomaly detection server 130, data store 140, and other publicly available computing devices. In some embodiments, network 160 is a private network that provides client device 120 with access to the anomaly detection server 130, data store 140, and other privately available computing devices. Network 160 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof. As described herein, semiconductor processing may include one or more of semiconductor manufacturing for wafers or display manufacturing (e.g., flat panel display manufacturing). Semiconductor processing fault detection is associated with one or more of semiconductor manufacturing for wafers (e.g., detecting faults in semiconductor manufacturing for wafers) or display manufacturing (e.g., detecting faults in display manufacturing).

The client device 120 may include a computing device such as personal computers (PCs), laptops, mobile phones, smart phones, tablet computers, netbook computers, network connected televisions ("smart TV"), network-connected media players (e.g., Blu-ray player), a set-top-box, over-the-top (OTT) streaming devices, operator boxes, etc. The client device 120 may be capable of transmitting information (e.g., a selection of manufacturing equipment 124 for the LSTM anomaly detection) via network 160 and receiving alerts via network 160. An alert may specify one or more of an anomaly, a cause of the anomaly, how to remedy the anomaly, whether the manufacturing equipment 124 has been shut down, or whether the manufacturing equipment 124 should be shut down. The client device 120 may display the alert via a graphical user interface (GUI). Each client device 120 may include an operating system that allows users to generate, view, and edit information and view alerts.

The client device 120 may include an anomaly communication component 122. Anomaly communication component 122 may receive user input (e.g., via a GUI displayed via the client device 120) and may generate, based on the user input, an indication that LSTM anomaly detection is to be executed for manufacturing equipment 124. The anomaly communication component 122 may transmit the indication to the anomaly detection server 130. The anomaly communication component 122 may receive an alert from the anomaly detection server 130 (e.g., responsive to the anomaly detection server 130 detecting an anomaly). In some embodiments, client device 120 transmits trace data 142 (e.g., from sensors 126 coupled to manufacturing equipment 124) to anomaly detection server 130 and the client device 120 receives an alert from the anomaly detection server 130.

The anomaly detection server 130 may include one or more computing devices such as a rackmount server, a router computer, a server computer, a personal computer, a mainframe computer, a laptop computer, a tablet computer, a desktop computer, etc. The anomaly detection server 130 may include an anomaly detection component 132. In some embodiments, the anomaly detection component 132 may receive trace data 142 (e.g., from sensors 126 coupled to manufacturing equipment 124). The trace data 142 may include recorded values over time and a corresponding time stamp for each value (e.g., a first recorded temperature at a first point in time, a second recorded temperature at a second point in time, etc.). The trace data 142 may be raw trace data (e.g., without any feature engineering). The anomaly detection component 132 may time window the trace data 142 to generate sequenced data sets 144 (e.g., a first set of values for a first window of time, a second set of values for a second window of time, etc.). The anomaly detection component 132 may time window the trace data 142 based on the corresponding time stamp for each value in the trace data 142.

The anomaly detection component 132 may provide the sequenced data sets 144 to the model 190 (e.g., a trained LSTM model) for LSTM anomaly detection. The anomaly detection component 132 may receive reconstruction data 146 (e.g., predicted sequenced data sets) from the model 190 based on the sequenced data sets 144.

Each data set in the sequenced data sets 144 may include a sequence (e.g., first value, second value, etc.), timestamps (e.g., time at first value, time at second value, etc.), and an indication of which sensor corresponds to which value (e.g., first sensor for first value, second sensor for second value, etc.). Each data set in the reconstruction data 146 may include a corresponding sequence, corresponding timestamps (e.g., same timestamps, shifted timestamps), and an indication of which sensor corresponds to which value.

The anomaly detection component 132 may determine a model reconstruction error 148 based on a difference between the sequenced data sets 144 and the reconstruction data 146. The anomaly detection component 132 may compare the model reconstruction error 148 to a threshold and, based on the comparison, flag anomalies (e.g., identify an anomaly) and provide a ranking of sensors 126 that contributed to the anomalies.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store one or more of trace data 142 (e.g., historical trace data 142A, current trace data 142B, subsequent trace 142C), sequenced data sets 144 (e.g., sequenced data sets 144A of normal runs of historical trace data 142A, sequenced data sets 144B (current sequenced data set) of current trace data 142B, sequenced data sets 144C (future sequenced data set) of normal runs of subsequent trace data 142C), reconstruction data 146, or model reconstruction error 148. The trace data 142 may be raw sensor data received from sensors 126 during manufacturing processes performed by the manufacturing equipment 124. The trace data 142 may be raw sensor data corresponding to multiple types of measurements (e.g., two or more of pressure, temperature, flow, power, current, voltage, torque, etc.). The sequenced data sets 144 may be the trace data 142 time windowed into sets of sequenced data (e.g., a first set of sequenced data from seconds 1-5, a second set of sequenced data from seconds 6-10, etc.). Responsive to the sequenced data sets 144 being input into the model 190, reconstruction data 146 may be output from the model 190. The model reconstruction error 148 may be based on the difference between the sequenced data sets 144 and the reconstruction data 146.

In some embodiments, anomaly detection system 110 further includes server machine 170 and server machine 180. The server machines 170 and 180 may be one or more computing devices (such as a rackmount server, a router computer, a server computer, a personal computer, a mainframe computer, a laptop computer, a tablet computer, a desktop computer, etc.), data stores (e.g., hard disks, memories databases), networks, software components, or hardware components.

Figure 2:
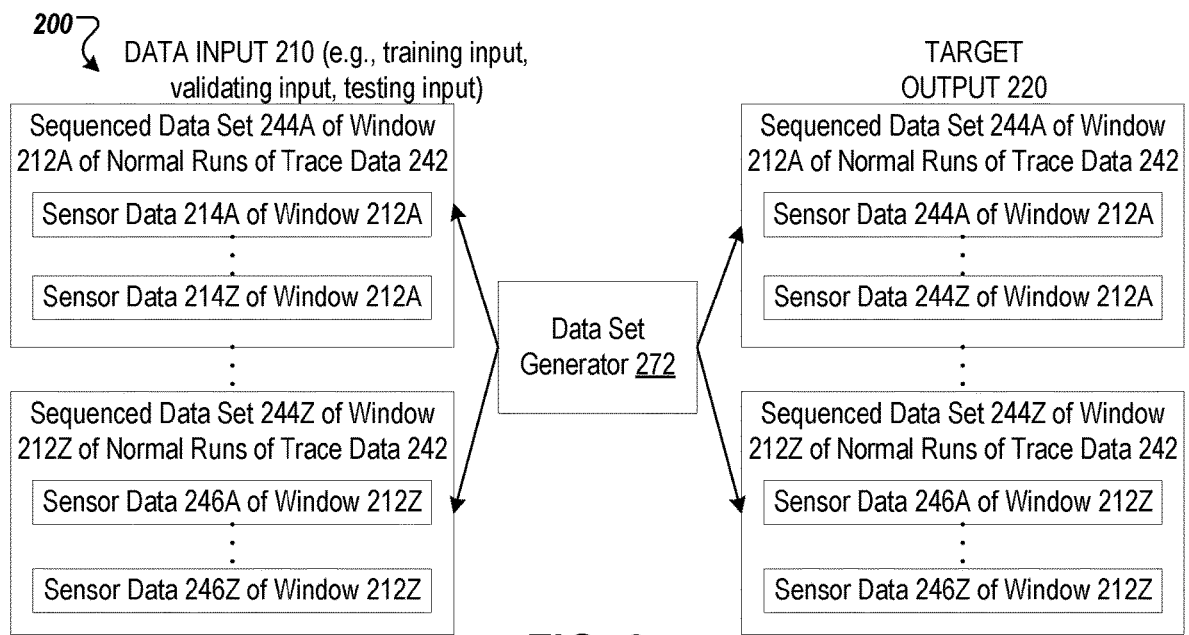
FIG. 2 is an example data set generator to create data sets for a machine learning model using normal runs of manufacturing processes, according to certain embodiments.

Server machine 170 includes a data set generator 172 that is capable of generating one or more data sets (e.g., a set of data inputs 210 and a set of target outputs 220 in FIG. 2) to train, validate, or test a machine learning model 190. Some operations of data set generator 172 are described in detail below with respect to FIGS. 2 and 5. In some embodiments, the data set generator 172 may partition the sequenced data sets 144 into a training set (e.g., sixty percent of the sequenced data sets 144), a validating set (e.g., twenty percent of the sequenced data sets 144), and a testing set (e.g., twenty percent of the sequenced data sets 144). Server machine 180 includes a training engine 182. In some embodiments, server machine 180 includes a training engine 182, a validation engine 184, and a testing engine 186. The training engine 182 may be capable of training a machine learning model 190 using the training set from data set generator 172. The training engine 182 may generate one or more trained machine learning models 190 (e.g., a multi-layer LSTM model 800 of FIGS. 7 and 8A-C, Encoder-Decoder LSTM model 900 of FIG. 9, etc.).

The validation engine 184 may be capable of validating a trained machine learning model 190 using the validation set from data set generator 172. The validation engine 184 may determine an accuracy of each of the trained machine learning models 190 based on the validation set. The validation engine 184 may discard trained machine learning models 190 that have an accuracy that does not meet a threshold accuracy.

The testing engine 186 may be capable of testing a trained machine learning model 190 using a testing set from data set generator 172. The testing engine 186 may determine a trained machine learning model 190 that has the highest accuracy of all of the trained machine learning models based on the testing sets.

The machine learning model 190 may refer to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. The machine learning model 190 may use one or more of a multilayer LSTM model (see FIGS. 7 and 8A-C), a Encoder-Decoder LSTM model (see FIG. 9), etc.

In some embodiments, the anomaly detection component 132 may generate sequenced data sets 144A from historical traced data 142A and may provide the sequenced data sets 144A to the data set generator 172. The data set generator 172 may provide the sequenced data sets 144A as input and output to one or more of training engine 182, validation engine 184, and/or testing engine 186 to one or more of train, validate, or test the machine learning model 190.

Anomaly detection component 132 may generate sequenced data sets 144B from current trace data 142B, provide the sequenced data sets 144B as input to the trained machine learning model 190, and run trained machine learning model 190 on the input to obtain one or more outputs. As described in detail below with respect to FIG. 6, anomaly detection component 132 may be capable of extracting reconstruction data 146 from the output of the trained machine learning model 190. The anomaly detection component 132 may also extract confidence data from the output. The confidence data may indicate a level of confidence that subsequent trace data 142C (e.g., trace data that occurs after the current trace data 142B) is to correspond to the reconstruction data 146. The anomaly detection component 132 may use the confidence data to determine an anomaly or the cause of the anomaly based on the reconstruction data 146.

The confidence data may include or indicate a level of confidence of the reconstruction data 146 corresponding to the subsequent trace data 142C. In one example, the level of confidence is a real number between 0 and 1 inclusive, where 0 indicates no confidence of the reconstruction data 146 corresponding to the subsequent trace data 142C and 1 indicates absolute confidence of the reconstruction data 146 corresponding to the subsequent trace data 142C.

For purpose of illustration, rather than limitation, aspects of the disclosure describe the training of a machine learning model and use of a trained learning model using information pertaining to sequenced data sets 144 to determine reconstruction data 146. In other implementations, a heuristic model or rule-based model is used to determine reconstruction data 146 based on trace data (e.g., historical trace data 142A, current trace data 142B, etc.). Any of the information described with respect to data inputs 210 of FIG. 2 may be monitored or otherwise used in the heuristic or rule-based model.

In some embodiments, the functions of client device 120, anomaly detection server 130, server machine 170, and server machine 180 may be provided by a fewer number of machines. For example, in some embodiments server machines 170 and 180 may be integrated into a single machine. In some other embodiments, server machine 170, server machine 180, and anomaly detection server 130 may be integrated into a single machine.

In general, functions described in one embodiment as being performed by client device 120, server machine 170, and server machine 180 can also be performed on anomaly detection server 130 in other embodiments, if appropriate. In addition, the functionality attributed to a particular component can be performed by different or multiple components operating together. For example, in some embodiments, the anomaly detection server 130 may receive the user input indicating manufacturing equipment 124 (e.g., a semiconductor processing tool) for the LSTM anomaly detection and the anomaly detection server 130 may provide the alert and/or shut down the manufacturing equipment 124 based on detected anomalies. In another example, client device 120 may one or more of generate the sequenced data sets 144 from the trace data 142, generate the model reconstruction error 148 from the reconstruction data 146 and sequenced data sets 144, compare the model reconstruction error 148 to a threshold, flag anomalies, or rank sensors 126 based on the model reconstruction error 148. In another example, the data set generator 172 may generate sequenced data sets 144 based on trace data 142.

In addition, the functions of a particular component can be performed by different or multiple components operating together. One or more of the anomaly detection server 130, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Although embodiments of the disclosure are discussed in terms of trace data 142 received from sensors 126 coupled to manufacturing equipment 124, embodiments may also be generally applied to data received over time. Embodiments may be generally applied to optimizing processes that generate data over time. Examples of manufacturing equipment 124 for wafer or display manufacturing are physical vapor deposition (PVD) equipment, chemical vapor deposition (CVD) equipment, atomic layer deposition (ALD) equipment, chemical mechanical polishing (CMP) equipment and etch equipment.

FIG. 2 is an example data set generator 272 (e.g., data set generator 172 of FIG. 1) to create data sets for a machine learning model 290 (e.g., model 190 of FIG. 1) using trace data 242 (e.g., historical trace data 142A of FIG. 1), according to certain embodiments. System 200 of FIG. 2 shows data set generator 272, data inputs 210, and target outputs 220.

In some embodiments, data set generator 272 generates a data set (e.g., training set, validating set, testing set) that includes one or more data inputs 210 (e.g., training input, validating input, testing input) and one or more target outputs 220. The data set may also include mapping data that maps the data inputs 210 to the target outputs 220. Data inputs 210 may also be referred to as "sequenced data sets" or "information." In some embodiments, data set generator 272 may provide the data set to one or more of the training engine 182, validating engine 184, or testing engine 186, where the data set is used to train, validate, or test the machine learning model 190. Some embodiments of generating a training set may further be described with respect to FIG. 5.

Figure 4:
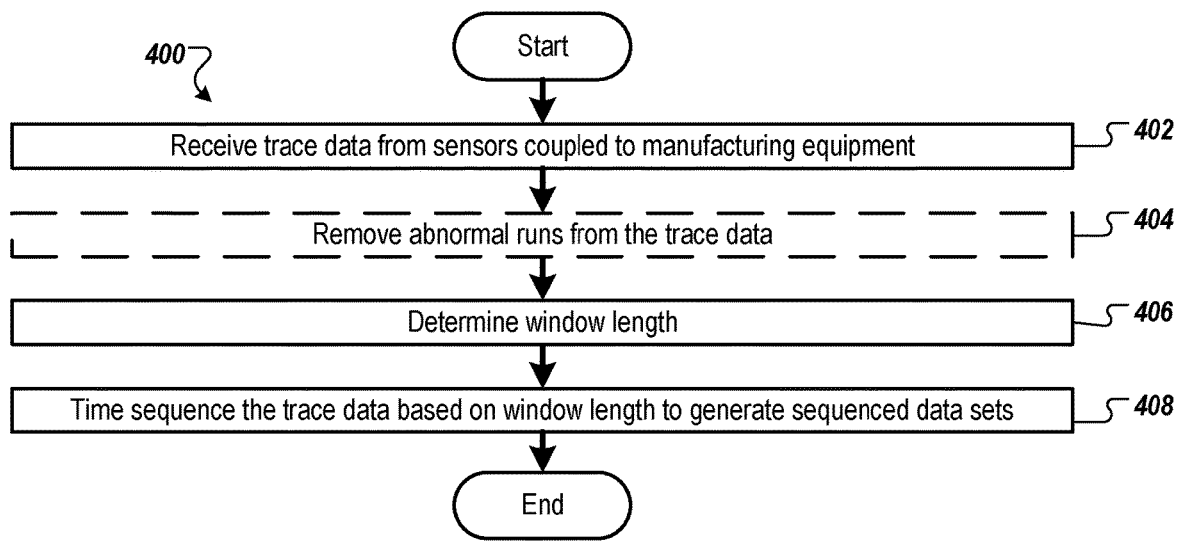
FIGS. 4-7 are flow diagrams illustrating example methods of anomaly detection, according to certain embodiments.

Data inputs 210 and target output 220 may include one or more sequenced data sets 244 of normal runs (e.g., sensor data that does not correspond to anomalies) of trace data (e.g., sequenced data sets 144A of normal runs of historical trace data 142A) from one or more windows of time 212 (see FIG. 4). In some embodiments, target output 220 is the same as data input 210 (e.g., target output 220 corresponds to the same windows of time 212 as data input 210). In some embodiments, the target output 220 is offset from the data input 210 by one or more windows of time 212.

Each sequenced data set 244 may include one or more sets of sensor data 214 (e.g., trace data 142 from a corresponding sensor 126) from a corresponding window of time 212.

Data inputs 210 and target outputs 220 to train, validate, or test a machine learning model may include information for particular manufacturing equipment 124 (e.g., a particular semiconductor processing tool) or a particular facility (e.g., for a particular semiconductor manufacturing facility). For example, the sequenced data set 244 used to train the model may correspond to the same manufacturing equipment 124 (e.g., the same type of manufacturing equipment 124, the same type of manufacturing equipment 124 in the same manufacturing facility, the same piece of manufacturing equipment, etc.) as the current sequenced data set 144B that is to be input into the trained model. In some embodiments, the information used to train the machine learning model may be from specific groups of components of manufacturing equipment or manufacturing facility having specific characteristics (e.g., components from a specific timeframe, components for a specific type of manufacturing equipment, etc.) and allow the trained machine learning model to determine outcomes for a specific group of components based on input for sequenced data sets 144 associated with one or more components sharing characteristics of the specific group. In some embodiments, the information used to train the machine learning model may be for components from two or more manufacturing facilities and may allow the trained machine learning model to determine outcomes for components based on input from one manufacturing facility.

In some embodiments, subsequent to generating a data set and training, validating, or testing machine learning model 190 using the data set, the machine learning model 190 may be further trained, validated, or tested (e.g., using additional data for a data set) or adjusted (e.g., adjusting weights associated with input data of the machine learning model 190, such as weights in a neural network) using subsequent data (e.g., subsequent sequenced data sets 144C).

Figure 3:
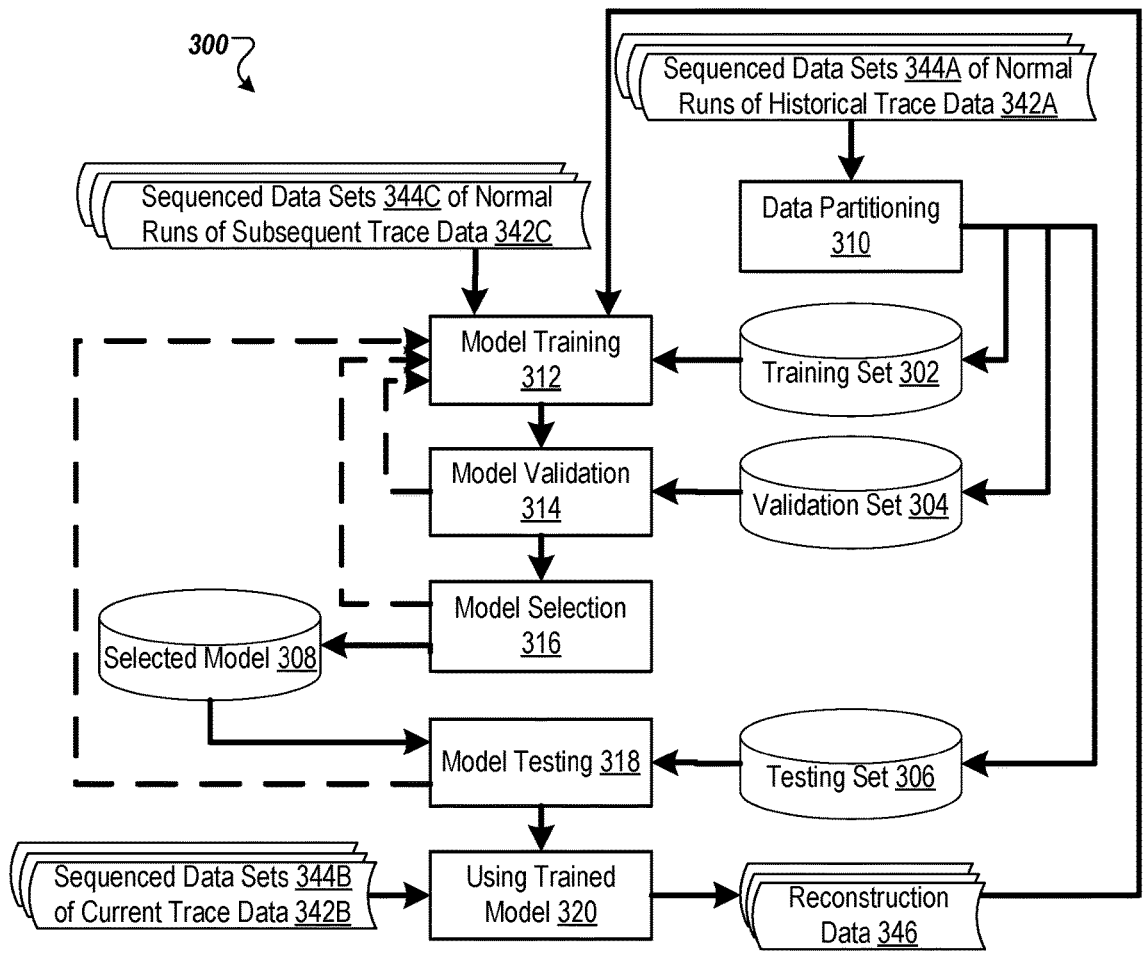
FIG. 3 is a block diagram illustrating generating reconstruction data, according to certain embodiments.

FIG. 3 is a block diagram illustrating a system 300 for generating reconstruction data 346 (e.g., reconstruction data 146 of FIG. 1), according to certain embodiments. The system 300 may be a system for LSTM anomaly detection for multi-sensor equipment monitoring.

At block 310, the system 300 (e.g., anomaly detection system 110 of FIG. 1) performs data partitioning (e.g., via data set generator 172 of server machine 170 of FIG. 1) of the sequenced data sets 344A of normal runs of historical trace data 342A (e.g., sequenced data sets 144A of normal runs of historical trace data 142A of FIG. 1) to generate the training set 302, validation set 304, and testing set 306.

At block 312, the system 300 performs model training (e.g., via training engine 182 of FIG. 1) using the training set 302. The system 300 may train multiple models using sequenced data sets 244 of the training set 302 (e.g., the target output 220 is from the same window of time 212 as the data input 210, the target output 220 is offset by one or more windows of time 212 from the data input 210, training with different weights, etc.). Model training may optimize hyperparameters (e.g., layers of the LSTM model, time window length, etc.). For example, the system 300 may train a first model with a first time window length and a first amount of layers and may train a second model with a second time window length (different from the first time window length) and a second amount of layers (different from the first amount of layers).

At block 314, the system 300 performs model validation (e.g., via validation engine 184 of FIG. 1) using the validation set 304. The system 300 may validate each of the trained models using sequenced data sets 244 from corresponding windows of time 212. At block 314, the system may determine an accuracy of each of the one or more trained models and may determine whether one or more of the trained models has an accuracy that meets a threshold accuracy. Responsive to determining that none of the trained models has an accuracy that meets a threshold accuracy, flow returns to block 312 where the system 300 performs model training using different sequenced data sets 344 and/or different windows of time 212 for the training set 302. Responsive to determining that one or more of the trained models has an accuracy that meets a threshold accuracy, flow continues to block 316.

At block 316, the system 300 performs model selection to determine which of the one or more trained models that meet the threshold accuracy has the highest accuracy (e.g., the selected model 308). Responsive to determining that two or more of the trained models that meet the threshold accuracy have the same accuracy, flow may return to block 312 where the system 300 performs model training using further refined training sets corresponding to further refined sequenced data sets 344 or windows of time for determining a trained model that has the highest accuracy.

At block 318, the system 300 performs model testing (e.g., via testing engine 186 of FIG. 1) using the testing set 306 to test the selected model 308. At block 318, the system 300 may determine whether accuracy of the selected model 308 meets a threshold accuracy using the testing set 306. Responsive to accuracy of the selected model 308 not meeting the threshold accuracy (e.g., the selected model 308 is overly fit to the validation set 304), flow continues to block 312 where the system 300 performs model training using different training sets corresponding to different sequenced data sets 344 or windows of time. Responsive to determining that the selected model 308 has an accuracy that meets a threshold accuracy based on the testing set 306, flow continues to block 320. In at least block 312, the model may output (e.g., predict) sequenced data sets 344 (e.g., the same windows of time, offset by one or more windows of time) based on the sequenced data sets 344 and in block 318, the system 300 may apply the model on the remaining data (e.g., testing set 306) to test the predictions.

At block 320, system 300 uses the trained model (e.g., selected model 308) to receive sequenced data sets 344B of current trace data 342B (e.g., sequenced data sets 144B of current trace data 142B of FIG. 1, current sequenced data sets, etc.) associated with manufacturing equipment 124 and to output reconstruction data 346 (e.g., reconstruction data 146 of FIG. 1) of the manufacturing equipment 124.

Responsive to receiving reconstruction data 346, flow may continue to block 312 (e.g., via a feedback loop) where the reconstruction data 346 and sequenced data sets 344C of normal runs of subsequent trace data 342C (e.g., sequenced data sets 144C of normal runs of subsequent trace data 142C of FIG. 1, future sequenced data sets, etc.) are compared to update the trained model via model training.

FIGS. 4-7 are flow diagrams illustrating example methods 400, 500, 600, and 700 associated with anomaly detection, according to certain embodiments. Methods 400, 500, 600, and 700 may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In one embodiment, methods 400, 500, 600, and 700 may be performed, in part, by anomaly detection system 110. In some embodiments, methods 400, 500, 600, and 700 may be performed by anomaly detection server 130. In some embodiments, a non-transitory computer readable storage medium stores instructions that when executed by a processing device (e.g., of anomaly detection system 110) cause the processing device to perform methods 400, 500, 600, and 700.

For simplicity of explanation, methods 400, 500, 600, and 700 are depicted and described as a series of acts. However, acts in accordance with this disclosure can occur in various orders and/or concurrently and with other acts not presented and described herein. Furthermore, not all illustrated acts may be performed to implement the methods 400, 500, 600, and 700 in accordance with the disclosed subject matter. In addition, those skilled in the art will understand and appreciate that the methods 400, 500, 600, and 700 could alternatively be represented as a series of interrelated states via a state diagram or events.

FIG. 4 is a flow diagram of a method 400 for generating sequenced data sets for anomaly detection, according to certain embodiments. In some embodiments, method 400 is performed by processing logic of anomaly detection component 132 of the anomaly detection server 130.

At block 402, the processing logic receives trace data 142 from sensors 126 coupled to manufacturing equipment 124. In some embodiments, the trace data 142 is historical trace data 142A that was stored in the data store 140 and that was measured by sensors 126 based on previous manufacturing processes of the manufacturing equipment 124. In some embodiments, the trace data is current trace data 142B measured by sensors 126 and for which reconstruction data 146 (e.g., a prediction) is to be generated by the LSTM model. In some embodiments, the trace data is subsequent trace data 142C that is measured after the current trace data 142B and that may be compared to the reconstruction data 146 to determine accuracy of the LSTM model.

At block 404, the processing logic identifies normal runs of the trace data 142. In one embodiment, the processing logic may calculate a corresponding error value for each value of the sensor data (e.g., by calculating an average error (e.g., model reconstruction error 148) and comparing each value to the average to determine the corresponding error value). The processing logic may compare the error values to a threshold error value (e.g., +/−5 sigma from the average of the model reconstruction error 148). The processing logic may identify normal runs of the trace data 142 as the values of the sensor data that are less than the threshold error value (e.g., within +/−5 of the average of the model reconstruction error 148). The processing logic may perform block 404 for generating sequenced data sets 144A of normal runs of historical trace data 142A and for generating sequenced data sets 144C of normal runs of subsequent trace data 142C. The processing logic may not perform block 404 for generating sequenced data sets 144B of current trace data 142B (e.g., the sequenced data sets 144B may contain normal runs and runs with anomalies).

At block 406, the processing logic determines window length. In some embodiments, the window length may be determined by user input of a window length. In another embodiment, window length may be an output of the LSTM model. In another embodiment, models 190 may be trained using different sequenced data sets 144 that each has a different window length. At block 406, the processing logic may determine the window length corresponding to the most accurate trained model 190.

At block 408, the processing logic time sequences the trace data 142 based on the window length to generate sequenced data sets 144. For example, for a 5-second window length, the processing logic may generate a first sequenced data set 144 from seconds 0-5, a second sequenced data set 144 from seconds 6-10, etc. At block 408, processing logic may generate one or more of sequenced data sets 144A of normal runs of historical trace data 142A, sequenced data sets 144B of current trace data 142B, or sequenced data sets 144C of subsequent trace data 142C.

Figure 5:
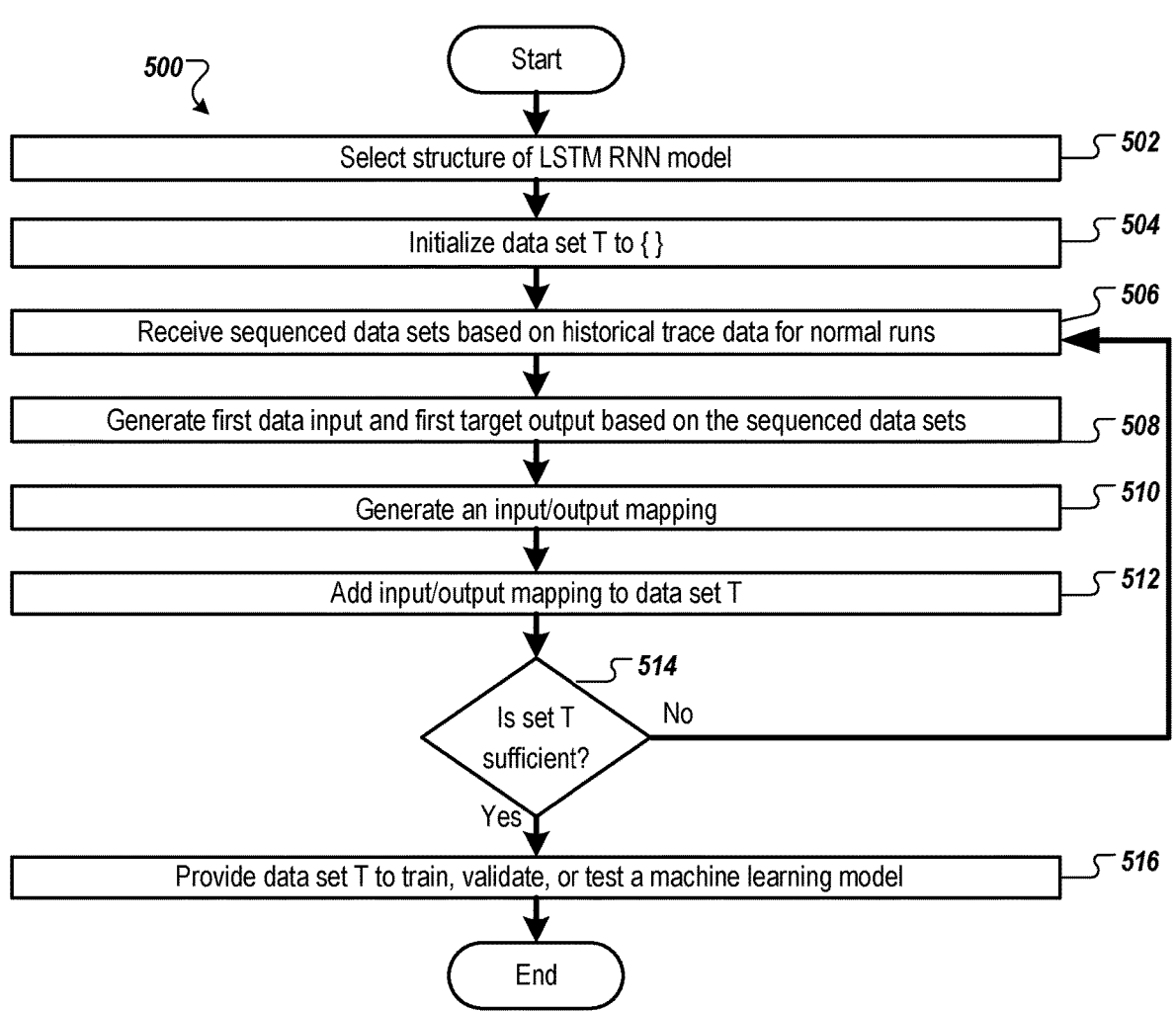

FIG. 5 is a flow diagram of a method 500 for generating a data set for a machine learning model, according to certain embodiments. Anomaly detection system 110 may use method 500 to at least one of train, validate, or test a machine learning model, in accordance with embodiments of the disclosure. In some embodiments, one or more operations of method 500 may be performed by data set generator 172 of server machine 170 as described with respect to FIGS. 1 and 2. It may be noted that components described with respect to FIGS. 1 and 2 may be used to illustrate aspects of FIG. 5.

Referring to FIG. 5, at block 502, the processing logic selects structure of a LSTM RNN model. For example, the processing logic may select multilayer LSTM model 800 (see FIGS. 7 and 8A-C) or Encoder-Decoder LSTM model 900 (see FIG. 9).

At block 504, the processing logic initializes a data set T to an empty set.

At block 506, the processing logic receives sequenced data sets 144A based on normal runs of historical trace data 142A. The sequenced data sets 144A may be generated by method 400 of FIG. 4 (e.g., abnormal runs may be removed from sequenced data set of block 506).

At block 508, the processing logic generates first data input (e.g., first training input, first validating input, first testing input) and first target output based on the sequenced data sets. In some embodiments, the first target output is the same as the first data input (e.g., sequenced data sets from the same time windows). In some embodiments, the first target output offset by one or more windows of time from the first data input.

At block 510, processing logic optionally generates mapping data that is indicative of an input/output mapping. The input/output mapping (or mapping data) may refer to the data input (e.g., one or more of the data inputs described herein), the target output for the data input (e.g., where the target output identifies sequenced data sets at the same windows of time as the data input, sequenced data sets offset by one or more windows of time from the data input, etc.), and an association between the data input(s) and the target output.

At block 512, processing logic adds the mapping data generated at block 510 to data set T.

At block 514, processing logic branches based on whether data set T is sufficient for at least one of training, validating, or testing machine learning model 190. If so, execution proceeds to block 516, otherwise, execution continues back at block 506. It should be noted that in some embodiments, the sufficiency of data set T may be determined based simply on the number of input/output mappings in the data set, while in some other implementations, the sufficiency of data set T may be determined based on one or more other criteria (e.g., a measure of accuracy, etc.) in addition to, or instead of, the number of input/output mappings.

At block 516, the processing logic provides data set T to train, validate, or test a machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In some embodiments, the data set T may be partitioned into a training set, a validation set, and a testing set (e.g., the training set may be 60%, the validation set may be 20%, and the validation set may be 20%). Responsive to the machine learning model being trained (e.g., and validated, tested, and meeting a threshold accuracy), the trained machine learning model may be used (e.g., by anomaly detection component 132) for anomaly detection (see FIGS. 3 and 6).

Figure 6:
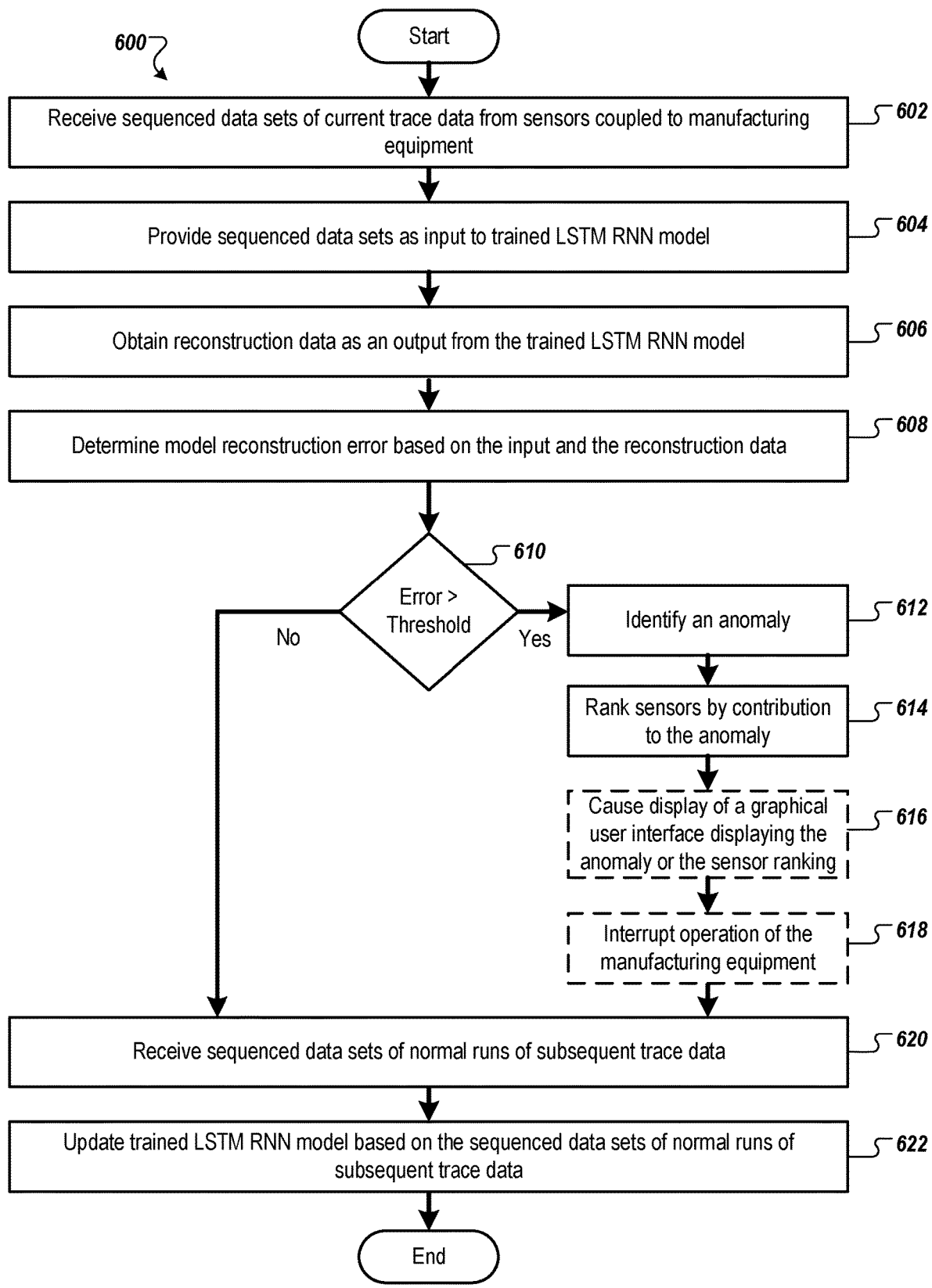

FIG. 6 is a flow diagram of a method 600 for using a trained machine learning model (e.g., model 190 of FIG. 1) for anomaly detection, according to certain embodiments.

Referring to FIG. 6, at block 602, the processing logic receives sequenced data sets 144B of current trace data 142B from sensors 126 coupled to manufacturing equipment 124. The sequenced data sets may be generated by blocks 402, 406, and 408 of FIG. 4 (e.g., abnormal runs may not be removed from sequenced data set 144B of block 602).

At block 604, the processing logic provides the sequenced data sets 144B as input to a trained LSTM RNN model (e.g., model 190 of FIG. 1). The trained LSTM RNN model may have been trained using a data set T from FIG. 5.

At block 606, the processing logic obtains reconstruction data 146 as an output from the trained LSTM RNN model. In some embodiments, the processing logic obtains one or more outputs from the trained machine learning model and extracts, from the one or more outputs, a level of confidence of the reconstruction data 146.

At block 608, the processing logic determines model reconstruction error 148 based on the input and the reconstruction data 146. In some embodiments, the processing logic determines the model reconstruction error 148 based on a difference between the reconstruction data 146 and the sequenced data sets 144B (e.g., comparing the input to the reconstruction data 146 (e.g., one or more outputs). For example, if the reconstruction data 146 is the same as the sequenced data sets 144B, the model reconstruction error 148 is zero.

At block 610, the processing logic determines whether the value of the model reconstruction error 148 is greater than a threshold error value. In some embodiments, the sequenced data sets 144B, the reconstruction data 146, and the model reconstruction error 148 each contain a plurality of values corresponding to a respective sensor 126 during a window of time. For example, the sequenced data sets 144B may contain a first and a second temperature value and a first and a second pressure value corresponding to a first window of time. The reconstruction data 146 may contain a third and a fourth temperature value and a third and a fourth pressure value corresponding to the first window of time. The model reconstruction error may contain a difference between the first and third temperature values, a difference between the second and fourth temperature values, a difference between the first and third pressure values, and a difference between the second and fourth pressure values. At block 610, the aggregate for all of the differences in the model reconstruction error 148 may be compared to the threshold error value. For example, the sum of the difference between the first and third temperature values, the difference between the second and fourth temperature values, the difference between the first and third pressure values, and the difference between the second and fourth pressure values may be compared to the threshold error value.

In some embodiments, the threshold error value is set by user input via the client device 120. In some embodiments, the processing logic sets the threshold error value based on an average (e.g., more than +/−5 sigma different than an average corresponding to the historical trace data 142A).

Responsive to the value of the model reconstruction error 148 not being greater than the threshold error value, flow continues to block 620. Responsive to the value of the model reconstruction error 148 being greater than the threshold error value, flow continues to block 612.

At block 612, the processing logic identifies an anomaly (e.g., generates anomaly scores from the one or more outputs (e.g., reconstruction data) from the trained LSTM RNN model). In some embodiments, the anomaly is based on sensor data from one sensor. In some embodiments, the anomaly is based on sensor data from a combination of sensors. The processing logic may determine whether there is an anomaly for any combination of sensors (e.g., without user input of a specific combination of sensors). In some embodiments, the anomaly identified by the processing logic is based on one or more of a change in amplitude, a change in frequency, a phase shift, a vertical shift, etc. In some embodiments, a single anomaly score is generated for each run. In some embodiments, a single anomaly score is generated for each sensor 126.

At block 614, the processing logic ranks sensors by contribution to the anomaly. In some embodiments, the model reconstruction error 148 is a set of differences between the reconstruction data 146 and the sequenced data set 144. The set of differences may include a corresponding value (e.g., corresponding portion of the model reconstruction error 148) for each of the sensors 126. The sensors 126 may be ranked based on a corresponding portion of the model reconstruction error 148 for each sensor. The sensor that has the highest difference between the reconstruction error 148 and the sequenced data set 144 may be ranked first, the sensor with the second highest difference ranked second, etc.

At block 616, the processing logic causes display of a graphical user interface displaying one or more of the anomaly or the sensor ranking. In some embodiments, the graphical user interface displays a graphical representation of contribution of one or more of the sensors 126 to the anomaly (e.g., a ranking of all of the sensors, a ranking of a subset of the sensors that made the highest contribution to the anomaly, etc.). In some embodiments, the graphical user interface indicates the sensor or the portion of the manufacturing equipment coupled to the sensor where the anomaly is located. In some embodiments, the graphical user interface indicates remedial measures that are to be taken (e.g., turn off the equipment, replace the sensor, replace a component of the manufacturing equipment, etc.) to stop the anomaly.

At block 618, the processing logic interrupts operation of the manufacturing equipment. In some embodiments, responsive to the value of the anomaly exceeding a threshold value, the processing logic is to shut down the equipment (e.g., to prevent damage to the equipment, to prevent damage to the semiconductors, to prevent damage to users, etc.). The steps in blocks 616 and 618 are examples of anomaly response actions that the processing logic can cause to happen in response to detection of an anomaly in block 612.

At block 620, the processing logic receives sequenced data sets 144C of normal runs of subsequent trace data 142C. The sequenced data sets 144C are associated with the actual subsequent trace data 142C (e.g., not a prediction).

At block 622, the processing logic updates the trained model based on the sequenced data sets 144C of normal runs of subsequent trace data 142C. In some embodiments, responsive to the sequenced data sets 144C of normal runs of subsequent trace data 142C differing from the reconstruction data 146 (e.g., the prediction being incorrect), the processing logic may update the trained LSTM RNN model with the sequenced data sets 144C of normal runs of the subsequent trace data 142C (e.g., storing the subsequent trace data 142C in the historical trace data 142A). The processing logic may update the trained LSTM RNN model (e.g., re-train, re-validate, and/or re-test) based on the sequenced data sets 144C of normal runs of subsequent trace data 142C.

Figure 7:
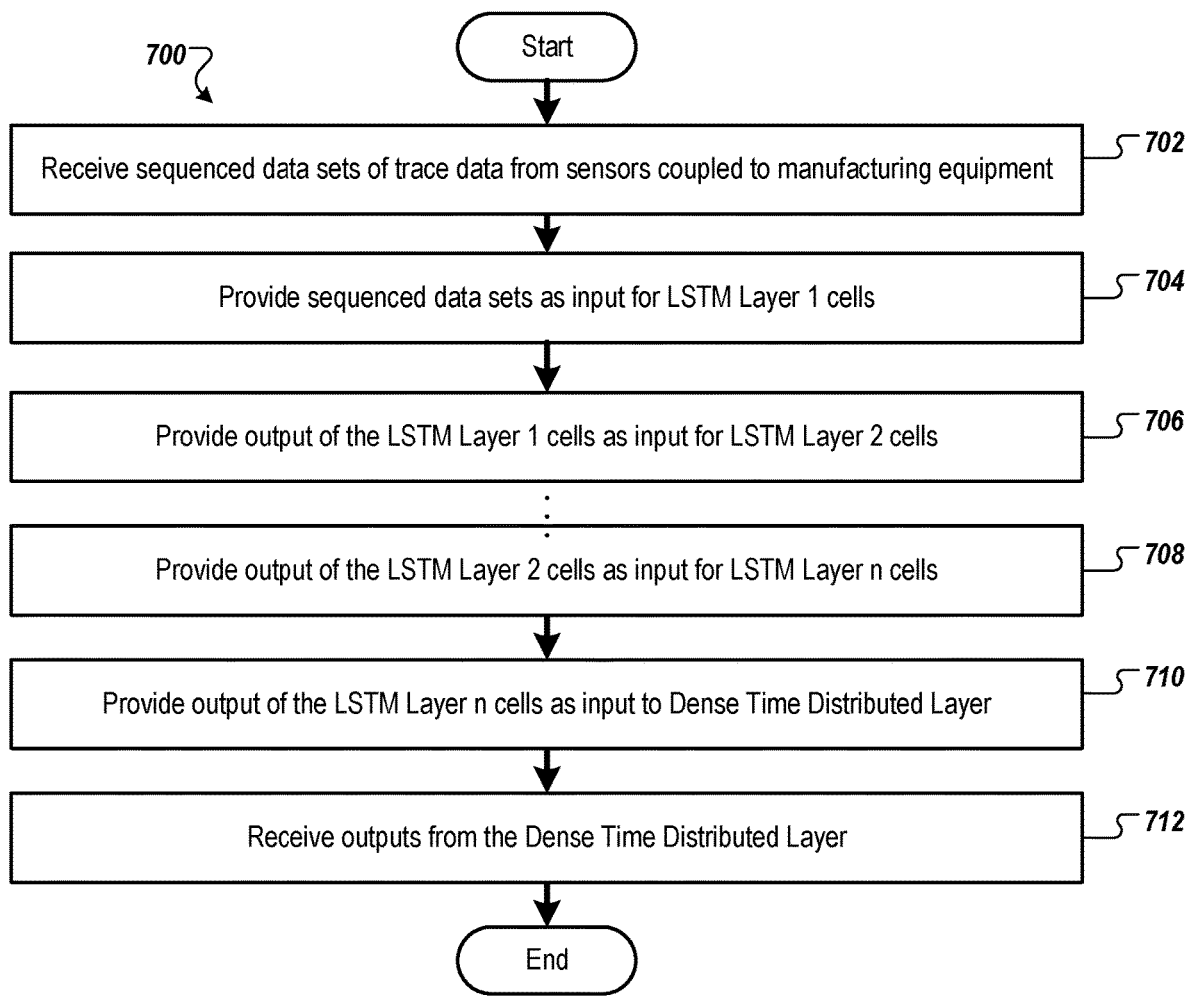

FIG. 7 is a flow diagram of a method 700 for using a multilayer LSTM model for anomaly detection (e.g., multilayer LSTM model is the multilayer LSTM model 800 of FIG. 8), according to certain embodiments. In some embodiments, the multilayer LSTM model is a deep LSTM neural network algorithm for anomaly detection. The multilayer LSTM model may be a deep LSTM model of stacked layers of LSTM cells used to learn the sequential representation of sensor data.

Referring to FIG. 7, at block 702, the processing logic receives sequenced data sets 144 of trace data 142 from sensors 126 coupled to manufacturing equipment 124. In some embodiments, the processing logic receives sequenced data sets 144B of current trace data 142B.

At block 704, the processing logic provides the sequenced data sets 144 as input for LSTM Layer 1 cells of a trained multilayer LSTM model.

At block 706, the processing logic provides the output of the LSTM Layer 1 cells as input for LSTM Layer 2 cells of the trained multilayer LSTM model.

At block 708, the processing logic provides the output of the LSTM Layer 2 cells as input for LSTM Layer n cells of the trained multilayer LSTM model. In some embodiments, the number of layers is configured based on user input via client device 120. In some embodiments, the number of layers is configured based on the model training, model validation, model selection, and model testing of the multilayered LSTM model of FIG. 3.

Figure 8A:
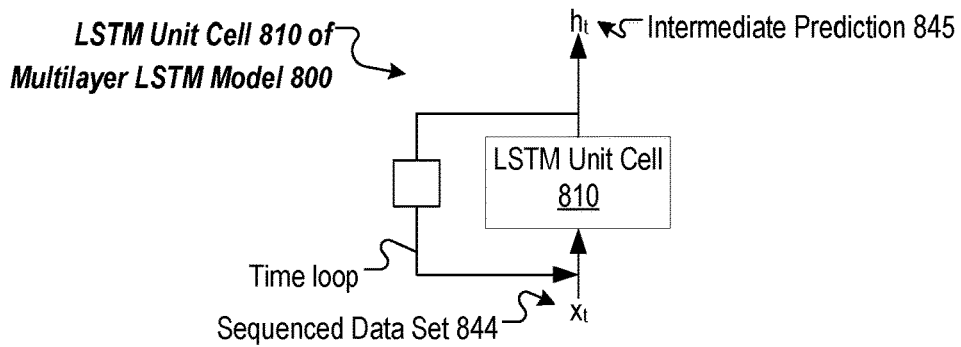
FIGS. 8A-C are block diagrams illustrating a multilayer LSTM model, according to certain embodiments.
Figure 8B:
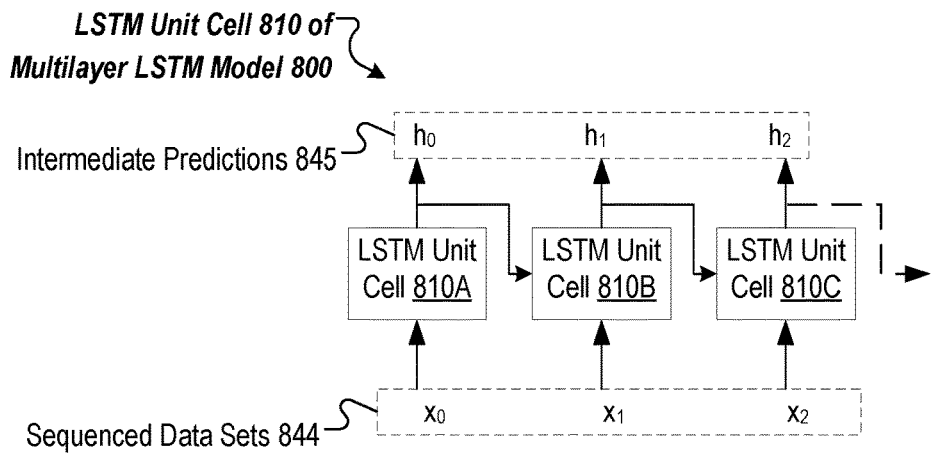
Figure 8C:
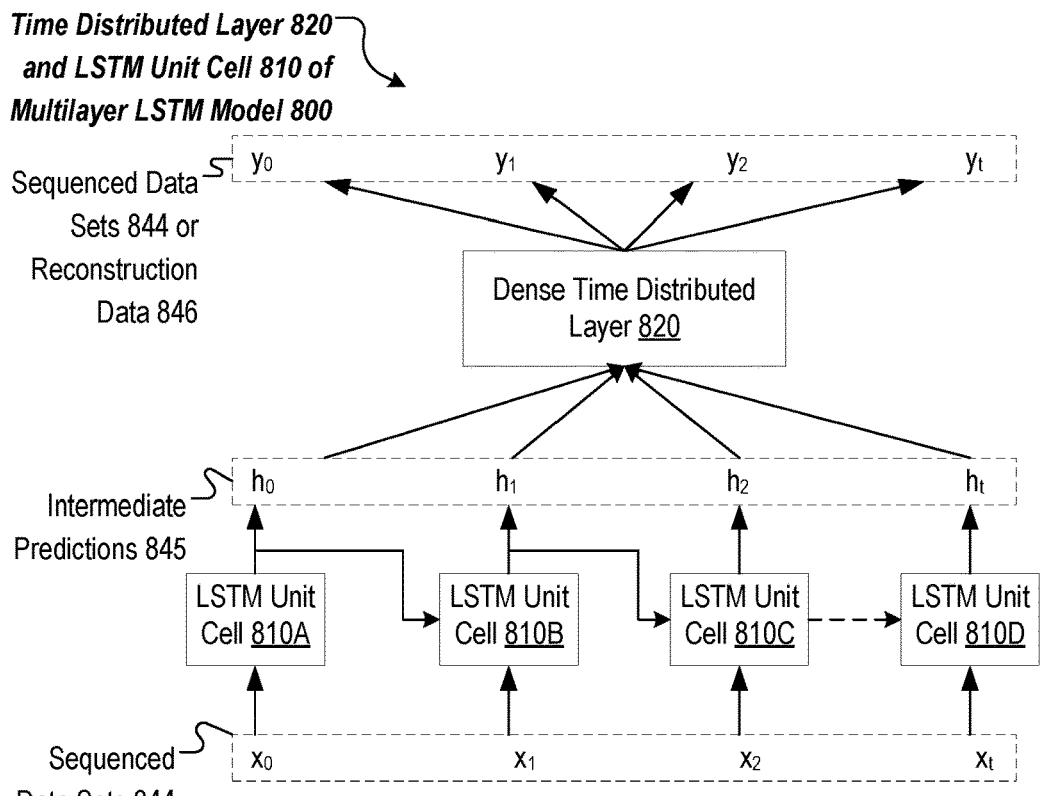

At block 710, the processing logic provides the output of the LSTM Layer n cells as input to a dense time distributed layer of the trained multilayer LSTM model (e.g., dense time distributed layer 820 of FIG. 8C).

At block 712, the processing logic receives reconstruction data 146 from the dense time distributed layer. The dense time distributed layer may aggregate the outputs of the LSTM Layer n cells to generate the reconstruction data 146. Responsive to receiving reconstruction data 146 from the dense time distributed layer, processing logic may perform blocks 608-622 of FIG. 6.

In some embodiments, prior to method 700, the processing logic may receive sequenced data sets 144A of historical trace data 142A for training of the multilayer LSTM model. The processing logic may provide the sequenced data sets 144A as data input and target output to the multilayer LSTM model (e.g., target output corresponds to the same windows of time as the data input, the target output is offset by one or more windows of time from the data input, etc.) to train the multilayer LSTM model. In some embodiments, after method 700, the processing logic may receive sequenced data sets 144C of subsequent trace data 142C (e.g., trace data received after the current trace data 142B). The subsequent data sets 144C may be used to re-train the multilayer LSTM model.

FIGS. 8A-C are block diagrams illustrating a multilayer LSTM model 800 (e.g., a deep LSTM neural network algorithm for anomaly detection), according to certain embodiments. In multilayer LSTM model 800, stacked layers of LSTM unit cells 810 may be used to learn sequential representation of sensor data (e.g., trace data 142 from sensors 126 coupled to manufacturing equipment 124). Input data to the multilayer LSTM model 800 is sequenced data sets 844 (e.g., sequenced data sets 144 of FIG. 1) that is generated by time windowing trace data. To train the multilayer LSTM model 800, the target output 220 can be the sequenced data sets 844 (e.g., the same as input sequences or a time step ahead of the sequenced input data). The output from a trained multilayer LSTM model 800 may be reconstruction data 946 (e.g., reconstruction data 146 of FIG. 1). Each layer of the multilayer LSTM model 800 may have multiple LSTM unit cells 810 (e.g., multiple distinct LSTM unit cells 810, multiple iterations of the same LSTM unit cell 810) that feed forward to the next layer. For training, the input and output to the multilayer LSTM model 800 is the same sequenced data sets 144A of normal runs of the historical trace data 142A (e.g., to learn the normal time series structure). After training, the trained multilayer LSTM model 800 may be used to predict future unknown runs (e.g., generate reconstruction data 146).

FIG. 8A is a block diagram illustrating an LSTM unit cell 810 of a multilayer LSTM model 800, according to certain embodiments. The LSTM unit cell 810 receives input including sequenced data set 844 ($x_t$) from a first window of time and intermediate prediction 845 ($h_{t-1}$) output from another LSTM unit cell 810. Based on the $x_t$ and $h_{t-1}$, the LSTM unit cell 810 outputs an intermediate prediction 845 ($h_t$). LSTM unit cell 810 is time looped based on the number of time steps (see FIG. 8B).

FIG. 8B is a block diagram illustrating the LSTM unit cell 810 of a multilayer LSTM model 800, according to certain embodiments. FIG. 8B may be an unrolled view of FIG. 8A (e.g., FIG. 8B is the same as FIG. 8A in an unrolled view.) A layer of the LSTM model 800 may include iterations of LSTM unit cell 810. Each iteration of LSTM unit cell 810 receives input including a respective sequenced data set 844 (x) from a respective window of time and a respective intermediate prediction 845 (h) output from another iteration of the LSTM unit cell 810. Based on the respective x and h, each iteration of the LSTM unit cell 810 outputs a respective intermediate prediction 845 (h).

FIG. 8C is a block diagram of the dense time distributed layer 820 (e.g., last layer) and an LSTM unit cell 810 of a multilayer LSTM model 800, according to certain embodiments. Each iteration of LSTM unit cell 810 receives input including a respective sequenced data set 844 (x) from a respective window of time and a respective intermediate prediction 845 (h) output from another iteration of the LSTM unit cell 810. Based on the respective x and h, each iteration of the LSTM unit cell 810 outputs a respective intermediate prediction 845 (h). In using the trained multilayer LSTM model 800, the dense time distributed layer 820 receives the intermediate predictions 845 (h), aggregates the intermediate predictions 845 into reconstruction data 846 (y) (e.g., reconstruction data 146). To train the multilayer LSTM model 800, sequenced data sets 844 ($y_t$) (e.g., sequenced data sets 144A of normal runs of historical trace data 142A) are input to the dense time distributed layer 820 as target output.

Figure 9:
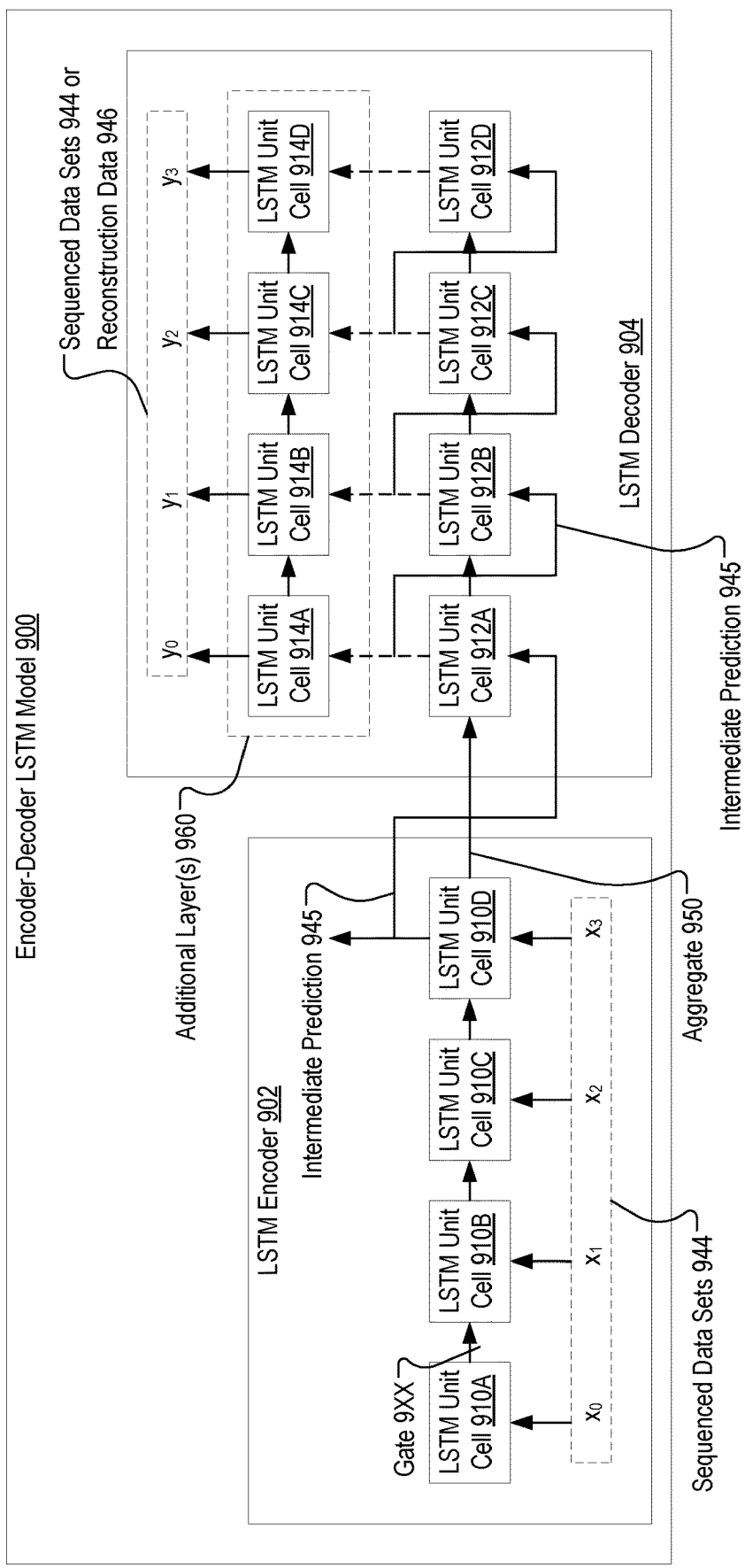
FIG. 9 is a block diagram illustrating an Encoder-Decoder LSTM model, according to certain embodiments.

FIG. 9 is a block diagram illustrating an Encoder-Decoder LSTM model 900 (e.g., a sequence-to-sequence (Seq2Seq) LSTM deep learning model) for anomaly detection, according to certain embodiments. The Encoder-Decoder LSTM model 900 may include (e.g., consist of) an LSTM encoder 902 (e.g., an encoder LSTM layer) and an LSTM decoder 904 (e.g., a multi-stack of decoder LSTM layers). The LSTM encoder 902 may learn the compressed representation of the input time-series data (e.g., sequenced data sets 144) and the LSTM decoder 904 may use this compressed representation to predict future time-series value sequence-to-sequence, achieving many-to-many time series predictions. The input may be sequenced data sets 144 at a previous time step and the output may be the sequenced data sets 144 in the next time step. The Encoder-Decoder LSTM model 900 may be trained with normal runs and the trained Encoder-Decoder LSTM model 900 may be used to predict future unknown time series runs.

The Encoder-Decoder LSTM model 900 may have capabilities of many-to-many or many-to-one (e.g., the quantity of input and the quantity of output may not match). Input data to the Encoder-Decoder LSTM model 900 includes sequenced data sets 944 (e.g., sequenced data sets 144 of FIG. 1) that is generated by time windowing trace data. To train the Encoder-Decoder LSTM model 900, the target output 220 can be the sequenced data sets 944 (e.g., the same as input sequences or a time step ahead of the sequenced input data). The output from a trained Encoder-Decoder LSTM model 900 may be reconstruction data 946 (e.g., reconstruction data 146 of FIG. 1). In some embodiments, an output of the Encoder-Decoder LSTM model 900 is the average window length (e.g., the output has a different window length than the input and that window length is used for generating sequenced data sets 144B of current trace data 142B). Based on having an LSTM encoder 902 and an LSTM decoder 904 that are separate from each other, the Encoder-Decoder LSTM model 900 may have a higher time efficiency than the multilayer LSTM model 800 of FIGS. 8A-C.

The LSTM Encoder 902 may include iterations of the LSTM unit cell 910 that receive a respective sequenced data set 944 (sequenced data set 144 of FIG. 1) corresponding to a respective time window and that receive an aggregate of sequenced data sets 944 from other iterations of the LSTM unit cell 910. A final iteration of the LSTM unit cell 910

(e.g., LSTM unit cell 910D) may transmit an aggregate 950 of the sequenced data sets 944 received by the iterations of the LSTM unit cell 910 and an intermediate prediction 945 (e.g., based on the aggregate of the sequenced data sets 944) to an LSTM unit cell 912 of the LSTM decoder 904. Each iteration of the LSTM unit cell 912 may receive an intermediate prediction 945 (from another iteration of the LSTM unit cell 912) and the aggregate of the sequenced data sets 944. Each iteration of the LSTM unit cell 912 may output an intermediate prediction 945 to another iteration of LSTM unit cell 912 and to a corresponding iteration of LSTM unit cell 914. The LSTM decoder 904 may have one or more additional layers 960 of LSTM unit cells (e.g., LSTM unit cell 914). In using the trained Encoder-Decoder LSTM model 900, the last layer may output reconstruction data 946. In training the Encoder-Decoder LSTM model 900, sequenced data sets 944 are input to the last layer as target output. Since the LSTM encoder 902 receives the input and the LSTM decoder 904 generates the output, the input and output do not have to be the same. Encoder-Decoder LSTM model 900 may receive a first number of sequenced data sets 944 that each have a first window of time and may output a second number (different from the first) of sets of reconstruction data 946 that have a second window of time (different from the first window of time).

Figure 10:
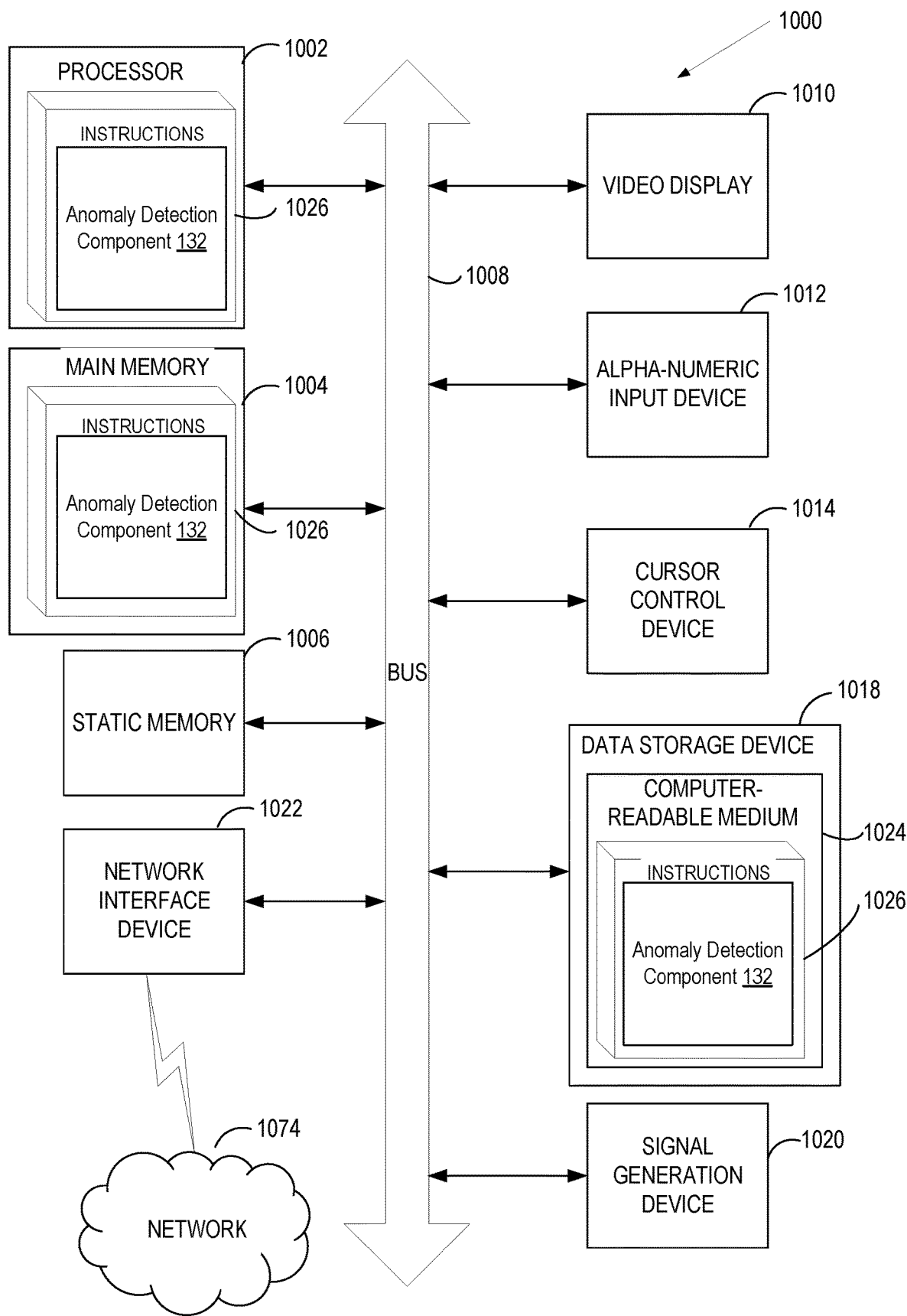
FIG. 10 is a block diagram illustrating a computer system, according to certain embodiments.

FIG. 10 is a block diagram illustrating a computer system 1000, according to certain embodiments. In some embodiments, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1006 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a cursor control device 1014 (e.g., a mouse), and a signal generation device 1020.

In some implementations, data storage device 1016 may include a non-transitory computer-readable storage medium 1024 on which may store instructions 1026 encoding any one or more of the methods or functions described herein, including instructions encoding the anomaly detection component 132 of FIG. 1 and for implementing methods described herein.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "training," "generating," "providing," "receiving," "time windowing," "obtaining," "using," "comparing," "determining," "flagging," "ranking," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations.

Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    training a long short-term memory (LSTM) recurrent neural network (RNN) model for semiconductor processing fault detection, the training of the LSTM RNN model comprising:
        generating training data for the LSTM RNN model, wherein the training data comprises first training input and first target output, wherein the first training input comprises a first window of time of first sensor data from a first plurality of sensors, wherein the first target output comprises at least one of the first window of time of the first sensor data from the first plurality of sensors or a second window of time of the first sensor data from the first plurality of sensors, wherein the first target output is same as the first training input or the first target output is offset from the first training input by one or more windows of time, and wherein the first sensor data is associated with normal runs of semiconductor or display manufacturing processes of semiconductor processing equipment; and
        providing the training data to train the LSTM RNN model on the first training input and the first target output to generate a trained LSTM RNN model, wherein an anomaly response action for the semiconductor processing equipment is to occur responsive to one or more outputs of the trained LSTM RNN model.

2. The method of claim 1 further comprising:
    receiving, from a plurality of sensors, trace data corresponding to the normal runs of the semiconductor or display manufacturing processes of the semiconductor processing equipment; and
    time windowing the trace data to generate a plurality of sequenced data sets, wherein each of the plurality of sequenced data sets corresponds to a respective time window, wherein the first training input and the first target output are based on at least a subset of the plurality of sequenced data sets, wherein the semiconductor processing fault detection is associated with one or more of semiconductor manufacturing for wafers or display manufacturing.

3. The method of claim 2, wherein the first training input comprises a first subset of the plurality of sequenced data sets at a first set of windows of time and a second subset of the plurality of sequenced data sets at a second set of windows of time, wherein each window of time of the second set of windows of time is offset from a corresponding window of time of the first set of windows of time by one or more windows of time.

4. The method of claim 2, wherein the first target output is the same as the first training input, wherein the first training input comprises the plurality of sequenced data sets.

5. The method of claim 1, wherein the LSTM RNN model comprises a plurality of layers of LSTM cells, wherein output of a first layer of the plurality of layers is input to a second layer of the plurality of layers.

6. The method of claim 1, wherein the LSTM RNN model comprises an encoder and a decoder, wherein the encoder determines a compressed representation of the first training input, wherein the decoder uses the compressed representation to predict the first target output.

7. A method comprising:
    Providing input to a trained long short-term memory (LSTM) recurrent neural network (RNN) model, wherein the input is based on runs of semiconductor or display manufacturing processes of semiconductor processing equipment, the trained LSTM RNN model being trained using training data comprising first training input and first target output, wherein the first training input comprises a first window of time of first sensor data from a first plurality of sensors, wherein the first target output comprises at least one of the first window of time of the first sensor data from the first plurality of sensors or a second window of time of the first sensor data from the first plurality of sensors, wherein the first target output is same as the first training input or the first target output is offset from the first training input by one or more windows of time, and wherein the first sensor data is associated with normal runs of the semiconductor or display manufacturing processes of the semiconductor processing equipment;
    obtaining one or more outputs from the trained LSTM RNN model, the one or more outputs comprising reconstruction data; and
    causing an anomaly response action for the semiconductor processing equipment to occur responsive to the one or more outputs.

8. The method of claim 7 further comprising:
    receiving, from a plurality of sensors, trace data corresponding to the semiconductor or display manufacturing processes of the semiconductor processing equipment; and
    time windowing the trace data to generate a plurality of sequenced data sets, wherein each of the plurality of sequenced data sets corresponds to a respective time window, wherein the input comprises the plurality of sequenced data sets, wherein semiconductor processing fault detection is associated with one or more of semiconductor manufacturing for wafers or display manufacturing.

9. The method of claim 8, wherein the input comprises the plurality of sequenced data sets at a first set of windows of time, wherein the reconstruction data comprises predicted sequenced data sets at a second set of windows of time, wherein each window of time of the second set of windows of time is offset from a corresponding window of time of the first set of windows of time by one or more windows of time.

10. The method of claim 7, wherein the LSTM RNN model comprises a plurality of layers of LSTM cells, wherein output of a first layer of the plurality of layers is input to a second layer of the plurality of layers.

11. The method of claim 7, wherein the LSTM RNN model comprises an encoder and a decoder, wherein the input comprises a current plurality of sequenced data sets, wherein the encoder determines a compressed representation of the input, wherein the decoder uses the compressed representation to predict a future plurality of sequenced data sets.

12. The method of claim 7, wherein the causing of the anomaly response action comprises:

comparing the input to the reconstruction data to generate model reconstruction error; and identifying an anomaly responsive to determining that the model reconstruction error is greater than a threshold error.

13. The method of claim 12 further comprising:

generating a plurality of anomaly scores from the one or more outputs, wherein each of the plurality of anomaly scores corresponds to a respective sensor of a plurality of sensors; and ranking contribution to the model reconstruction error by each of the plurality of sensors based on the plurality of anomaly scores.

14. A non-transitory computer readable storage medium having instructions stored thereon, which, when executed by a processing device, cause the processing device to perform operations comprising:

Providing input to a trained long short-term memory (LSTM) recurrent neural network (RNN) model, wherein the input is based on runs of semiconductor or display manufacturing processes of semiconductor processing equipment, the trained LSTM RNN model being trained using training data comprising first training input and first target output, wherein the first training input comprises a first window of time of first sensor data from a first plurality of sensors, wherein the first target output comprises at least one of the first window of time of the first sensor data from the first plurality of sensors or a second window of time of the first sensor data from the first plurality of sensors, wherein the first target output is same as the first training input or the first target output is offset from the first training input by one or more windows of time, and wherein the first sensor data is associated with normal runs of the semiconductor or display manufacturing processes of the semiconductor processing equipment;

obtaining one or more outputs from the trained LSTM RNN model, the one or more outputs comprising reconstruction data; and causing an anomaly response action for the semiconductor processing equipment to occur responsive to the one or more outputs.

15. The non-transitory computer readable storage medium of claim 14, wherein the operations further comprise:

receiving, from a plurality of sensors, trace data corresponding to the semiconductor or display manufacturing processes of the semiconductor processing equipment; and time windowing the trace data to generate a plurality of sequenced data sets, wherein each of the plurality of sequenced data sets corresponds to a respective time window, wherein the input comprises the plurality of sequenced data sets, wherein semiconductor processing fault detection is associated with one or more of semiconductor manufacturing for wafers or display manufacturing.

16. The non-transitory computer readable storage medium of claim 15, wherein the input comprises the plurality of sequenced data sets at a first set of windows of time, wherein the reconstruction data comprises predicted sequenced data sets at a second set of windows of time, wherein each window of time of the second set of windows of time is offset from a corresponding window of time of the first set of windows of time by one or more windows of time.

17. The non-transitory computer readable storage medium of claim 14, wherein the LSTM RNN model comprises a plurality of layers of LSTM cells, wherein output of a first layer of the plurality of layers is input to a second layer of the plurality of layers.

18. The non-transitory computer readable storage medium of claim 14, wherein the LSTM RNN model comprises an encoder and a decoder, wherein the input comprises a current plurality of sequenced data sets, wherein the encoder determines a compressed representation of the input, wherein the decoder uses the compressed representation to predict a future plurality of sequenced data sets.

19. The non-transitory computer readable storage medium of claim 14, wherein the operations further comprise:

comparing the input to the reconstruction data to generate model reconstruction error;

determining that the model reconstruction error is greater than a threshold error; and flagging the model reconstruction error.

* * * * *